April 14, 1970  K. H. LANGE  3,505,940
ROLLFILM CAMERA

Filed Feb. 7, 1967  2 Sheets-Sheet 1

INVENTOR:
Karl Heinz Lange
By
Sparrow and Sparrow
Attorneys

April 14, 1970   K. H. LANGE   3,505,940
ROLLFILM CAMERA
Filed Feb. 7, 1967   2 Sheets-Sheet 2
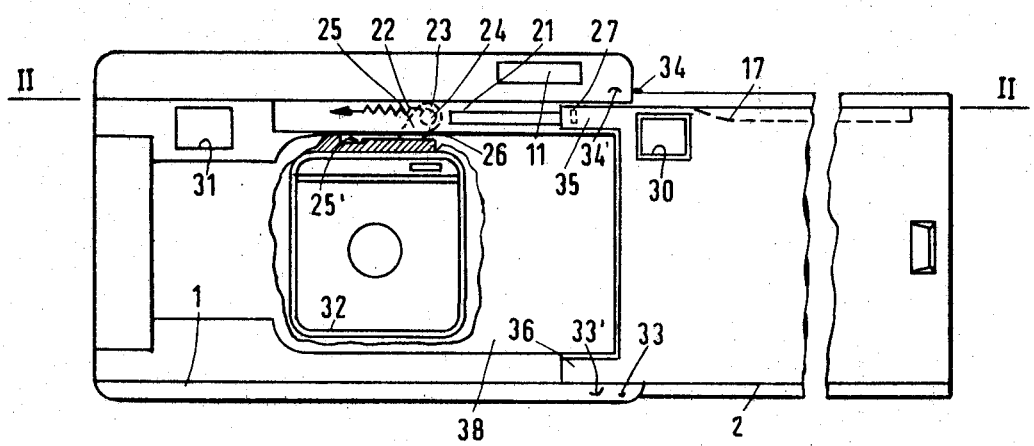
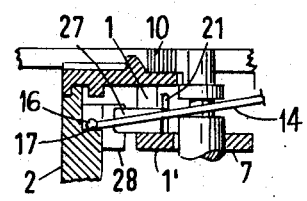
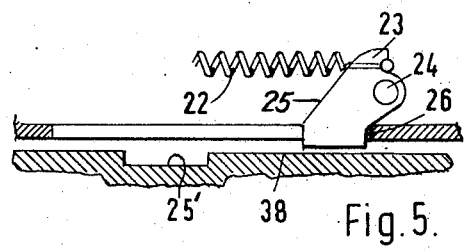
INVENTOR:
Karl Heinz Lange
By
Sparrow and Sparrow
Attorneys United States Patent Office 3,505,940
Patented Apr. 14, 1970

3,505,940
ROLLFILM CAMERA
Karl Heinz Lange, Bunde-Ennigloh, Germany, assignor to Balda-Kamerawerk Rudolf Gruter, Kommanditgesellschaft, Bunde, Westphalia, Germany, a German company
Filed Feb. 7, 1967, Ser. No. 614,509
Claims priority, application Germany, Feb. 8, 1966, B 85,702
Int. Cl. G03b 19/04
U.S. Cl. 95—31                                8 Claims

ABSTRACT OF THE DISCLOSURE

A rollfilm camera has a rear sliding cover and a slidable member operatively connected thereto. The member has a pivoted lever which cooperates with a notch in the film cartridge for indicating the sensitivity of the film. The slidable member is moved by the opening of the rear cover to a beginning position and, upon closing of the cover, is pulled by a spring in the opposite direction until the lever falls into the notch on the cartridge. A leaf spring cooperates with a cam on the rear cover to disengage a winding shaft upon opening of the rear cover.

BACKGROUND OF THE INVENTION

This invention relates to rollfilm cameras in general, and to improvements in such cameras in particular, pertaining mainly to simplified slide means by which an easier handling of the camera is attained.

Rollfilm cameras for the use of film spool cartridges of the "Instamatic" type are known in which the rear cover plate is either hinged or may be taken off for exchanging of the exposed film spool cartridge with a new one. The "Instamatic" type film spool cartridges contain a full film spool arranged for being unwound, an empty second spool arranged for winding of the film, which has a small shaft protruding outwardly over the upper face of the cartridge, and a light-proof film path between the two film spools, which has a window in the place opposite the lens of the camera. Conventionally there are mechanical means provided by which the film spool transport drive shaft is automatically uncoupled when the cover plate is unlatched. Furthermore, it is known that there are spring-operated slide means in certain types of such cameras which have a hinged rear cover plate, which are cocked by opening of the cover plate and which are unlatched by closing of the cover plate, snapping back instantaneously against an abutment on the film spool cartridge. The end position of this slide means which corresponds to the film sensitivity, influences the setting of the various automatic mechanisms including the setting of the lens diaphragm of the camera by several well-known means.

Problems involved in the hitherto known constructions are caused by the complexity of the mechanisms which leads to operational failures in the hands of users which are not specifically technically trained or experienced, and obviously also in the resulting higher costs of such cameras. These problems are intended to be solved by this invention which consists in the novel parts, construction arrangements, combinations and improvements herein shown and described. Objects and advantages of the invention wil be set forth in part hereafter and in part will be obvious herefrom or may be learned by practicing the invention, the same being realized and attained by means of the instrumentalities and combinations pointed out in the appended claims.

SUMMARY

It is an object of this invention to provide a rear slide cover for cameras of the type involved.

Furthermore it is the object of the invention to provide for spring-loaded means in the rear cover which serve the purpose of rendering the mechanisms of the camera inoperative when the cover is opened.

Another object of the invention is to provide control stops on the inside of the rear slide cover for automatically uncoupling the film spool drive in conjunction with spring means.

Yet another object of the invention is to provide the arrangement of the rear slide cover in the same plan of an auxiliary film sensitivity feeler slide.

A further object of the invention is to provide means and combinations of means in cameras of the type involved, for simplifying the mechanism of such cameras and reducing the costs of manufacturing thereof.

Various further and more specific purposes, features and advantages will clearly appear from the detailed description given below taken in connection with the accompanying drawings which form part of this specification and illustrate merely by way of examples embodiments of the device of the invention.

BRIEF DESCRIPTION OF DRAWINGS

In the following description and in the claims, parts will be identified by specific names for convenience, but such names are intended to be as generic in their application to similar parts as the art will permit. Like reference characters denote like parts in the several figures of the drawings, in which—

FIG. 3 is a rear view of the camera with the rear slide cover open (partly broken away) and a film spool cartridge inserted (partly broken away);

FIG. 4 is an enlarged detail of the left upper corner of FIG. 1;

FIG. 5 is an enlarged detail of the training auxiliary slide of FIG. 3, partly broken away;

DESCRIPTION

Figure 6:
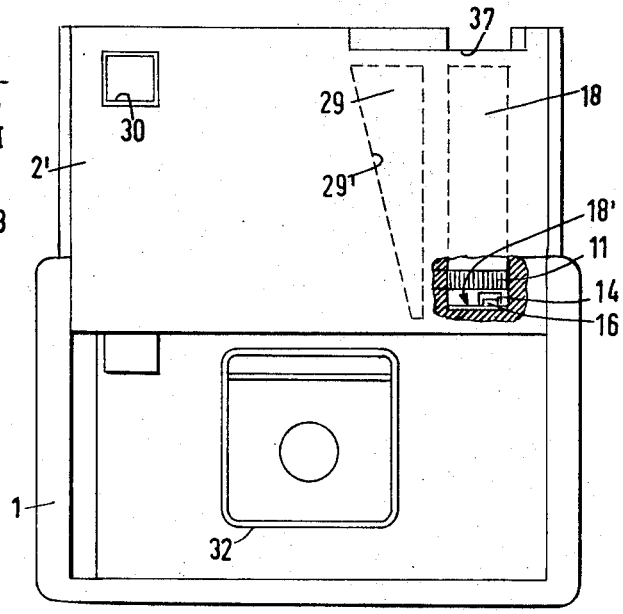
FIG. 6 shows a camera having a vertically operated rear slide cover.
Figure 2:
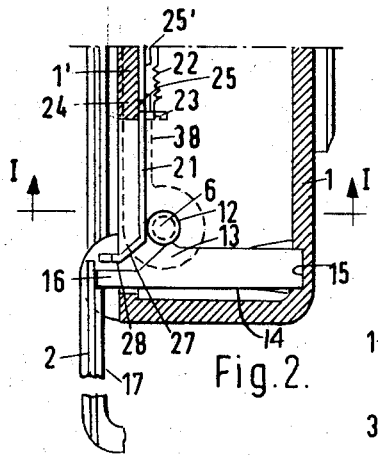
FIG. 2 is a horizontal longitudinal section of the camera, partly broken away, following the lines II—II in FIG. 1 and FIG. 3.

Referring now in more detail to the drawings illustrating preferred embodiments by which the invention may be realized, there is shown a camera having a housing 1, the rear side of which is closed by a slide 2 (FIG. 3) or 2′ (FIG. 6). Slide 2 (2′) is guided in tracks 3, 4. The space 5 in housing 1 is adapted for taking a rollfilm spool cartridge 38 of the "Instamatic" type which can be readily inserted after pulling slide 2 horizontally outwards or, in case of slide 2′, vertically upwards. Film spool cartridge 38 has a small shaft on the spool for winding of the film, which protrudes over the upper side of said cartridge. This is a well known conventional construction, not shown in the drawing. A short shaft 6 having a coupling end 6′ is rotatably located in bearings in the walls 7 and 8 of housing 1 on the side of the camera where the winding shaft of the film spool in the cartridge is located. Coupling end 6′ is adapted to engage the upper end of said small film spool winding shaft. Shaft 6 furthermore is arranged to be shifted axially in the bearings in walls 7 and 8 for disengaging the coupling connection between coupling end 6′ and the winding shaft of the film spool. Shaft 6 has gear teeth 9 on its upper end, which engage the internal gearing 10 of a hand-operated film transport wheel 11 which is rotatably held by a ring-shaped guide means 19 on upper wall 8 of housing 1 and which is eccentrically arranged with respect to shaft 6 so that gear teeth 9 constantly mesh with internal gearing 10. Shaft 6 has a groove 12 which is engaged by the lateral edge 13 of a leaf spring 14, one end of which is firmly held in a notch 15 in housing 1. The free end 16 of spring 14 is slideably supported by an inclined ledge 17 on the inside of slide 2, so that shaft 6 is axially moved upwards when slide 2 is pulled outwards, disengaging coupling end 6′ from said film spool shaft.

On an intermediate wall portion 1′ in housing 1 is an auxiliary slide 21 located in a plan parallel to slide 2 which is urged in one direction by a tension spring 22. Spring 22 is preferably not directly attached to slide 21 but is hooked on a nose 23 of a short catch lever 25 which is swingably pivoted on a stud 24. The lower end of lever 25 is apt to engage a notch 25′ of cartridge 38 when slide 2 is closed. By the cooperation of lever 25 with notch 25′, the opening and closing of the diaphragm of the lens of the camera corresponding to the film sensitivity is effectuated. The known mechanism for this automatic operation is not a part of this application. An abutment 26 is provided in housing 1 in the path of lever 25, so that lever 25 is lifted out of engagement with notch 25′ and furthermore out of the way of other abutments of cartridge 38 (not shown in the drawings) when slide 2 is pulled out and when lever 25 contacts a stationary abutment 26. A spent cartridge 38 now can be freely removed or a fresh cartridge can be inserted. Slide 21 has an angular end 27, and slide 2 has a corresponding abutment 28 which cooperates with angular end 27 when slide 2 is pulled outwards trailing slide 21 with it tensioning spring 22 at the same time. Obviously slide 21 will gradually follow the closing movement of slide 2 by the force of spring 22 until lever 25 again engages notch 25′.

Since spring 22 is tensioned by pulling of slide 2 outwards and thus tends to pull slide 2 back, latching knobs 33, 34 are provided which engage in tracks 3 and 4, respectively, by virtue of the natural elasticity of the walls of housing 1. In order to prevent slide 2 from being pulled out entirely, housing 1 is extended on the side where slide 2 is pulled out, and guide ends 35, 36 are provided on slide 2 so that it is still safely held in tracks 3 and 4 when it is pulled out for completely opening the rear side of the camera for uninhibited inserting of cartridge 38. A pair of small latching knobs 33′, 34′ prevent slide 2 from being pulled entirely out of the camera.

A small window 30 is provided in slide 2 and 2′ which corresponds to the viewfinder opening 31 in housing 1.

Figure 7:
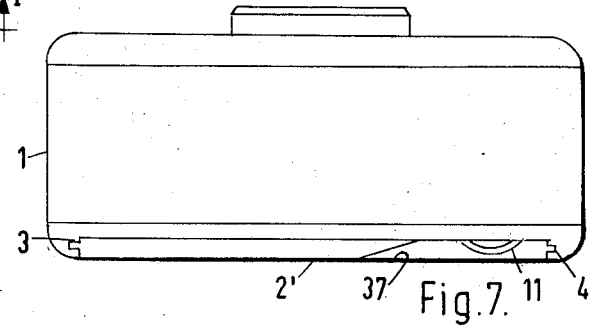
FIG. 7 is a top view of the camera shown in FIG. 6.

FIGS. 6 and 7 illustrate another embodiment of the invention, having a vertically movable rear side slide 2′ on the camera. In this case the movement of auxiliary slide 21 is performed by a grooved cam 29 having an engaging edge 29′ cooperating with angular end 27. Cam 29 is integrally molded on slide 2′. As shown in FIG. 7, a cutout 37 is provided in slide 2′ for film transport wheel 11. A second cam 18 is arranged on the inside of slide 2′ for operating of leaf spring 14.

Figure 1:
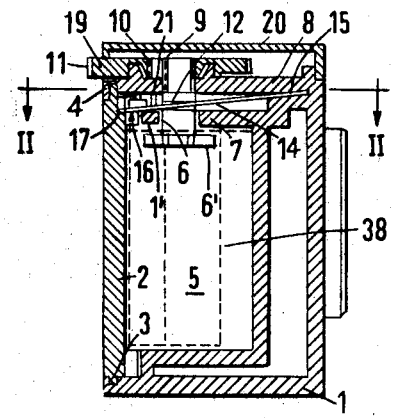
FIG. 1 is a cross section of the camera, following the lines I—I in FIG. 2 and FIG. 3.

The operation of the device may be described as follows:

When the camera is supposed to be "loaded," that is, when a fresh film spool cartridge is intended to be put into the camera, slide 2 is pulled outwards (or slide 2′ is pulled upwards, as the case may be) until knobs 33, 34 will latch in. By this operation, auxiliary slide 21 is trailed in the same direction, whereby spring 22 is tensioned, until lever 25 contacts abutment 26. Lever 25 tilts and the groove engaging end is lifted. Simultaneously free end 16 of leaf spring 14 has been lifted by sliding over ledge 17 (FIGS. 1 and 4), or engaging the edge 18′ of the cam face (FIG. 6) and has lifted shaft 6 axially by the engagement of lateral edge 13 in groove 12 of shaft 6. Thus, the coupling end 6′ is in its disengaged position, and the space for the film spool cartridge is entirely free for inserting of a fresh one. When slide 2 (or 2′) is pushed back for closing the rear wall of the camera, auxiliary slide 21 will follow under the pull of spring 22 until eventually lever 25 engages notch 25′, which is provided on the film spool cartridge corresponding to the sensitivity of the film. Basically and regardless whether slide 2 is moved either horizontally or vertically (2′) for opening and closing the camera, auxiliary slide 21 is moved against the force of tension spring 22 when slide 2 (2′) is opened. The spring force acts to retract auxiliary slide 21 until lever 25 engages notch 25′ when slide 2 (2′) is closed. Thereby further functions of the camera mechanisms such as proper setting of the lens diaphragm etc. of the camera become automatically operative. Simultaneously shaft 6 is lowered again until coupling end 6′ engages the corresponding coupling part of the small film spool shaft, or at least gets down on top of it. A slight turning of film transport wheel 11 in the latter case will immediately cause the two coupling ends to snap together. The camera is now ready for instant operation. When the roll film in the cartridge has been spent, it only is necessary to pull slide 2 (or 2′) out, reversing the operation as it has been outlined above.

While the invention has been described and illustrated wtih respect to a certain preferred example which gives satisfactory results, it will be understood by those skilled in the art after understanding the principle of the invention, that various other changes and modifications may be made without departing from the spirit and scope of the invention, and it is intended therefor in the appended claims to cover all such changes and modifications.

What I claim is:

1. Rollfilm camera having a slidable rear cover, said camera for the use of an instamatic type film spool cartridge having a stop corresponding to the sensitivity of said film, said camera having an auxiliary slide determining the setting of the lens diaphragm by engaging of said stop and comprising means on both said cover slide and on said auxiliary slide, said means transmitting the motion of said cover slide to said auxiliary slide controlling said setting of the lens diaphragm corresponding to said sensitivity of said film, a pivoting catch lever on said auxiliary slide, said lever engaging said stop for stopping the motion of said auxiliary slide, a tension spring on said lever, said spring moving said lever to said stop, when said second slide is closed and a stationary abutment in said camera for said lever, said abutment stopping the movement of said second slide when said second cover is opened, said abutment lifting said lever facilitating inserting of said film spool cartridge into said camera.

2. Rollfilm camera according to claim 1, and further comprising means for operating said cover slide horizontally.

3. Rollfilm camera according to claim 1, and comprising means for operating said cover slide vertically.

4. Rollfilm camera according to claim 3, and said auxiliary slide having connecting means for being trailed by said horizontal operation of said cover slide.

5. Rollfilm camera according to claim 1, and further comprising a shaft, a coupling end on said shaft for coupling same with the film spool of said cartridge, a groove in said shaft, and a leaf spring having a lateral edge engaging said groove.

6. Rollfilm camera according to claim 5, and said leaf spring having one end firmly held in said camera and having one free end, and said cover slide having an inclined ledge, said free end of said leaf spring sliding on said ledge.

7. Rollfilm camera according to claim 3, and comprising cam means on said vertically operated cover slide, said cam means having an inclined edge, said auxiliary slide engaging said edge, said auxiliary slide being moved against the force of said spring on said lever when said cover slide is upwardly moved and said slide being retracted by said spring when said cover slide is downwardly moved, closing said camera.

8. Rollfilm camera according to claim 5, and said leaf spring having one end firmly held in said camera and having one free end, and said cover slide having a cam face, said face having an edge, said edge engaging said leaf spring in the open position of said rear cover slide.

References Cited

UNITED STATES PATENTS 2,933,027  4/1960  Hollingworth et al. ----- 95—31
3,260,182  7/1966  Nerwin --------------- 95—31

NORTON ANSHER, Primary Examiner

D. S. STALLARD, Assistant Examiner